Aug. 30, 1955

O. STEINER 2,716,374

ROLL FILM MAGAZINE AND ROTATABLE
BACK FOR PHOTOGRAPHIC CAMERAS

Filed Nov. 2 1951

INVENTOR.
OSCAR STEINER

BY
*[signature]*
ATTORNEY

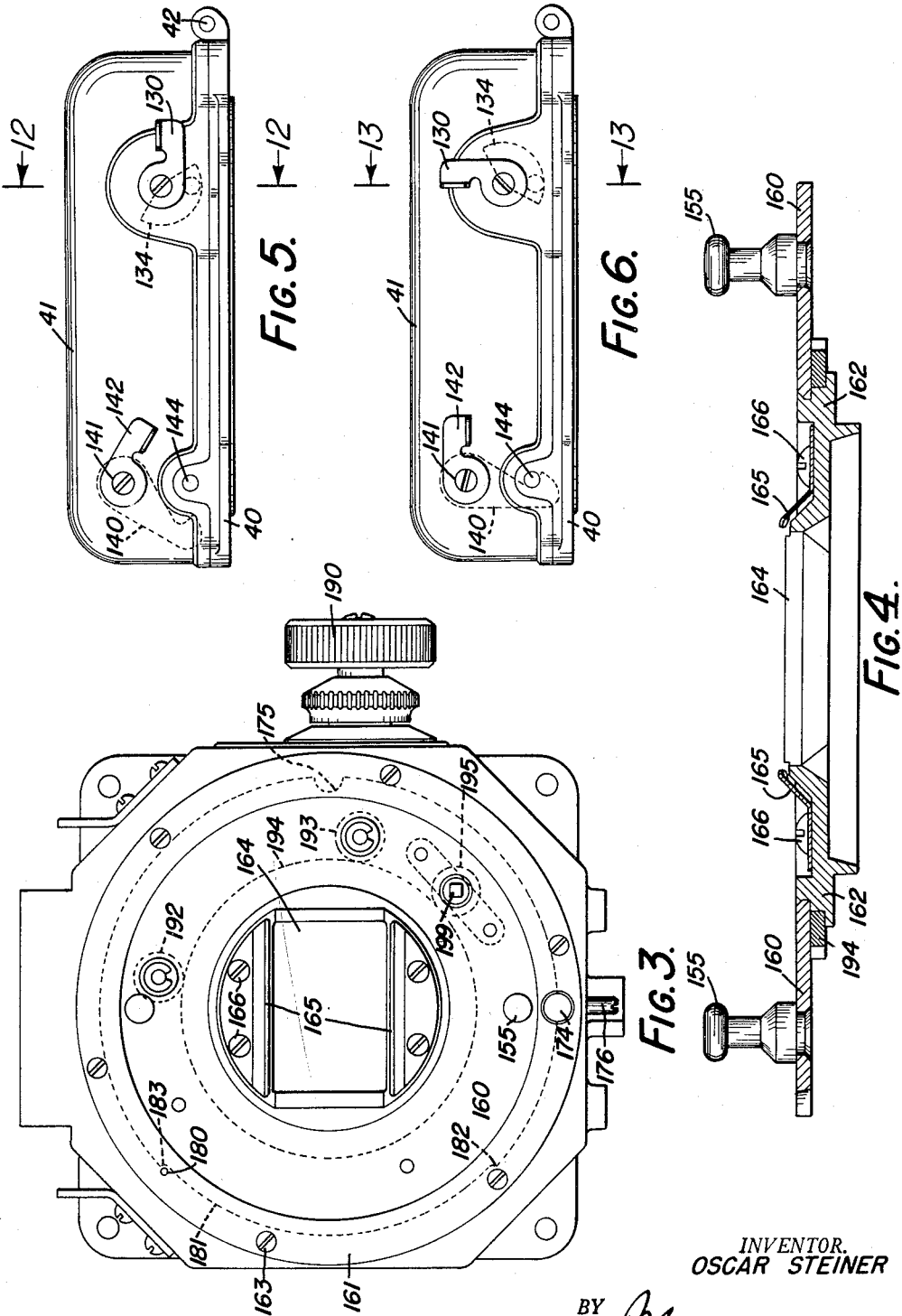

Aug. 30, 1955

O. STEINER 2,716,374

ROLL FILM MAGAZINE AND ROTATABLE
BACK FOR PHOTOGRAPHIC CAMERAS

Filed Nov. 2 1951

INVENTOR.
OSCAR STEINER

BY
ATTORNEY

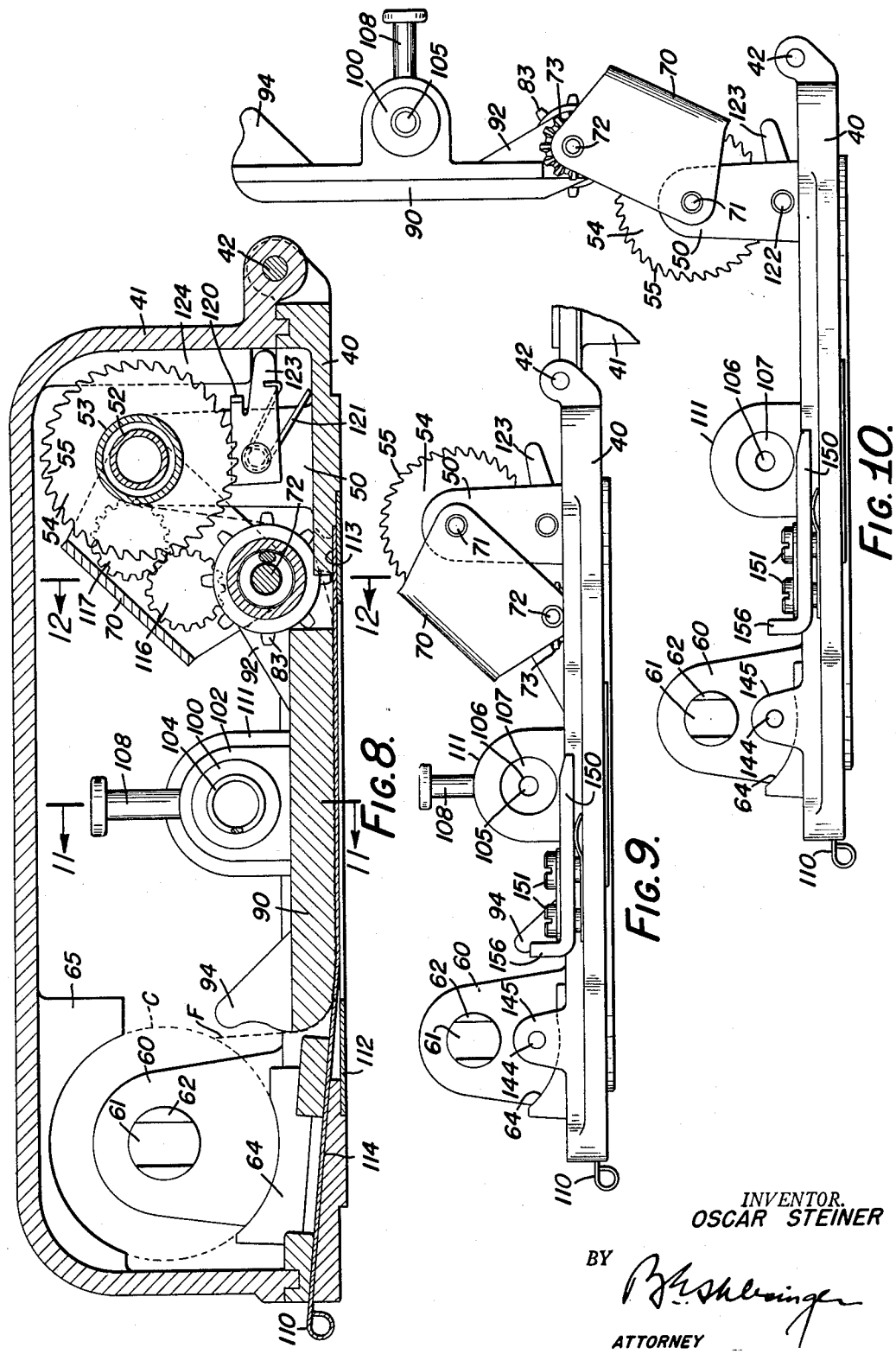

INVENTOR.
OSCAR STEINER
BY
ATTORNEY

United States Patent Office 2,716,374
Patented Aug. 30, 1955

2,716,374

ROLL FILM MAGAZINE AND ROTATABLE BACK FOR PHOTOGRAPHIC CAMERAS

Oscar Steiner, Rochester, N. Y., assignor to Graflex, Inc., Rochester, N. Y., a corporation of Delaware Application November 2, 1951, Serial No. 254,534

7 Claims. (Cl. 95—34)

The present invention relates to photographic cameras and more particularly to photographic cameras of the type in which the camera back is rotatably adjustable to position the camera's exposure aperture, and the film behind it, for either a horizotnal or a vertical picture, as desired. In a more specific aspect, the invention relates to removable backs or magazines for such cameras for holding the sensitized material on which the pictures are to be taken. In a still more specific aspect, the invention relates to a reflex camera of the geenral type disclosed in the King and Berlant U. S. Patent No. 2,550,698, granted May 1, 1951, and to a removable back and roll holder for such a camera.

One object of the invention is to provide a rotatable back or magazine for a camera of the type described which can quickly be loaded with film or unloaded.

Another object of the invention is to provide a film magazine in which the supply of film is from a removable roll-type cassette, and which is so constructed that the film may quickly and easily be threaded into the take-up spool.

A further object of the invention is to provide a removable magazine or back for a camera of the type described in which the drive to the film transport mechanism may be readily disengaged when the film is to be rewound into the cassette after it has been fully exposed.

Another object of the invention is to provide a camera of the type described in which the film will be held properly in the focal plane for exposure.

A further object of the invention is to provide a camera of the type described having a removable magazine or back and having film transport mechanism mounted partly in the body of the camera and partly in the back, and in which the portion of the film transport mechanism, which is in the magazine or back, will automatically be coupled in the correct position to the portion of the film transport mechanism, which is in the body of the camera, when the magazine or back is secured to the camera body.

Other objects of the invention will be apparent hereinafter from the specification and from the recital of the appended claims.

In the drawings:

Fig. 3 is a rear end view of the body portion of the camera housing;

Fig. 4 is a transverse section through the aperture plate of the camera and the ring gear of the transport mechanism on an elongated scale;

Figs. 5 and 6 are side elevations on a somewhat smaller scale of the removable back showing, respectively, different positions of the locking latch and of the sprocket shifting lever;

Fig. 8 is a longitudinal section on a somewhat enlarged scale through the magazine or back showing the cover closed;

Fig. 9 is a side elevation on a somewhat reduced scale of magazine or back with the cover open, and shown only fragmentarily;

Fig. 10 is a side elevation of the magazine or back with the cover removed and showing the focal plane plate swung up out of operative position to permit quick loading of the camera;

Figure 12:
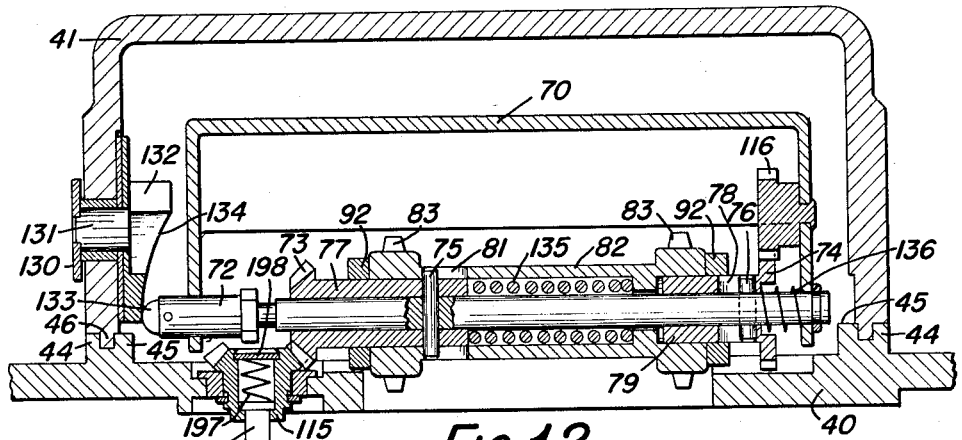
Figure 13:
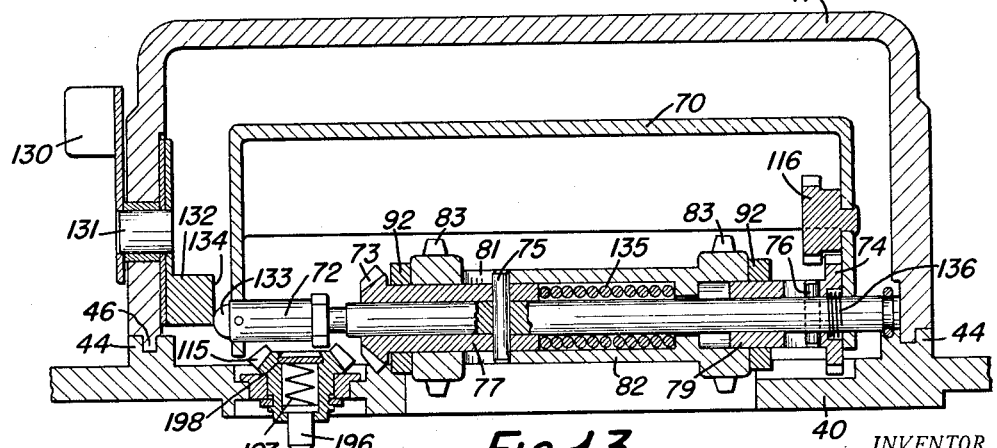

Fig. 12 is a transverse section through the magazine or back taken on the line 12—12 of Fig. 8 and also on the line 12—12 of Fig. 5 but in the latter case on an enlarged scale; and Fig. 13 is a similar section taken on the line 13—13 of Fig. 6 but on an enlarged scale, and showing the sprocket shaft moved axially to disengage the drive gear for rewinding.

The invention is shown as applied to a reflex camera of the general type disclosed in the U. S. Patent to King and Berlant, No. 2,550,698, granted May 1, 1951.

The camera illustrated comprises as its main structural components a body assembly 20, a lens board 21, a lamp housing 22 which is rigidly secured to the front of the lens board and moves therewith, a bellows 23 connecting the lens board and the body member 20, a removable and rotatable back 24 which is secured at the rear end of the body assembly and is rotatable with respect thereto, a hand-grip, or support 25, a viewfinder housing 26, and a viewfinder 27. A carrying strap 28 is also provided.

Mounted within the body assembly 20 is an inner housing 30 (Fig. 2) which is formed with an inclined baffle plate 31 against which the shutter plate 32 of the camera is adapted to seat when the shutter is closed. The shutter is hingedly mounted in the housing 30 upon a shaft 34. Pivotally mounted upon the shaft 34 also is a mirror 35 which is connected to the shutter by a detachable catch 36. The shutter plate 32 and mirror 35 are adapted to be moved upwardly by a spring (not shown), as described in the King and Berlant patent, when the camera trigger 37 is tripped to take a picture; and when the two reach upper position, the shutter plate 32 is disconnected from the mirror 35 and returned to its lower operative position by a spring 38 which is interposed between the shutter plate and the mirror. The shutter mechanism forms no part of the present invention and may be such as described in Patent No. 2,550,698.

The back comprises a base plate 40 (Figs. 7 to 13) having a cover 41 hingedly connected thereto by means of the hinge pin 42. The base plate 40 has a rearwardly projecting rib or ledge 44 (Fig. 7) formed thereon which is continuous and which is more or less of irregular polygonal shape. The base plate 40 also has another rib 45 formed thereon, projecting rearwardly and lying within the compass of the rib 44 and spaced therefrom and parallel thereto. The cover 41 has a rib or ledge 46 (Figs. 12 and 13) which projects from the inside face of the cover and extends around the whole of the inside face of the cover, and which is adapted to engage in the groove 47 (Fig. 7) formed between the two ledges or ribs 44 and 45 of the base plate 40, so as to provide a light-tight seal between the cover and the base plate when the cover is closed.

Mounted on the base plate 40 to be enclosed by the cover 41 are two spaced supports or bearing members 50 (Figs. 7 to 10). Journalled in these bearing members is a shaft 52 on which is mounted a take-up spool 53. This spool is formed adjacent opposite ends with axially-spaced flanges 54. These are provided with ratchet teeth 55. The spool is constantly urged in one direction about its axis by a coil spring 56 which is engaged at one end with one of the ratchet flanges 54 of the spool and at its opposite end with one of the bearing members 50.

Formed integral with the ledge 45 and projecting rearwardly therefrom is a bearing or support 60 in which is rotatably journalled a shaft 61. This shaft is provided with a fork 62 at its inner end, which is adapted to be engaged drivingly with the key end of the film spool of a conventional roll-type cassette which contains perforated roll film.

There are a pair of axially spaced saddles 64 secured to or integral with the base plate 40 to receive the film cassette C, which is supported also by a rest 66 riveted to the base plate 40. A saddle portion 65 is formed on the inside of the cover 41 to engage the cassette, when the cover is closed, to hold the cassette securely on the saddles 64.

Pivotally mounted upon the posts 50 by means of pins 71 is a generally U-shaped frame 70. Journalled in this frame is a shaft 72. This shaft is axially slidable in the frame. Secured to the shaft 72 to rotate therewith is a bevel gear 73 and a spur gear 74 (Figs. 12 and 13). The bevel gear 73 is secured to the shaft 72 by a pin 75. The spur gear 74 is secured to the shaft 72 by a pin 76. The pin 75 passes through the sleeve portion 77 of the gear 73 and engages in diametrically-opposed, axially extending slots 81 in the sleeve portion of the sprocket member 82. The pin 76 engages in diametrically-opposed, axially-extending slots 78 in the hub portion 79 of the gear 74. The sprocket member 82 is formed at opposite ends with sprockets 83.

Figure 7:
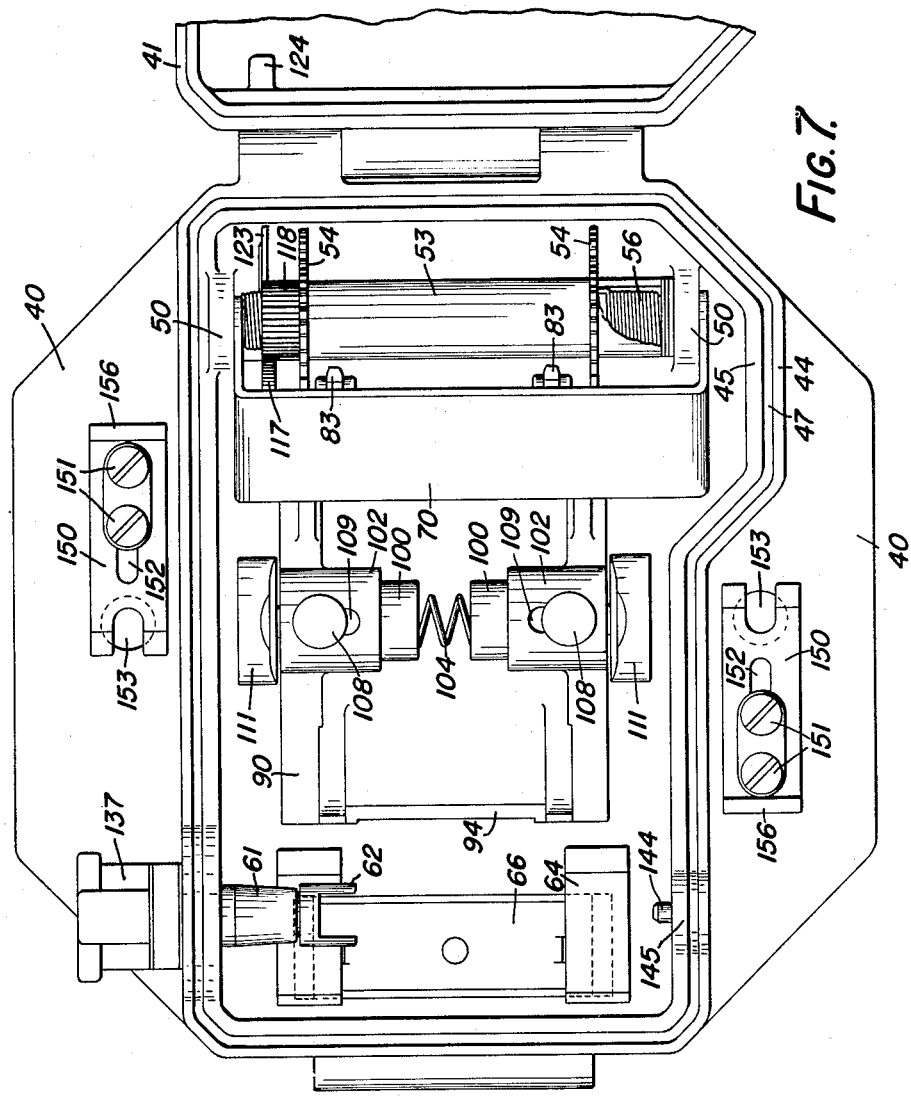
Fig. 7 is a rear elevation of the magazine or back with the cover shown only fragmentarily and open.

Adapted to be positioned between the saddles 64 for the cassette and the take-up spool 53 is a focal plane plate 90 (Figs. 7, 8 and 10). This plate has a plane front surface adapted to engage the back side of the film F to seat the film in the focal plane of the camera. The focal plane plate has ears 92 projecting from one end thereof which are journalled on the sleeve 77 (Figs. 12 and 13) of bevel gear 73 and the sleeve 79 of spur gear 74, respectively. At its opposite end the focal plane plate 90 is provided with a finger grip or lug 94 by means of which the focal plane plate can be gripped and swung upwardly about the axis of pins 71, as shown in Fig. 10, to permit the film to be threaded into the take-up spool 53 without difficulty.

The focal plane plate 90 is adapted to be locked in operative position, shown in Fig. 8, by a pair of axially-spaced plungers 100 (Figs. 7 and 11) which are slidable in axially-spaced bearings 102 formed on the rear face of the focal plane plate and which are constantly urged apart to locking position by the interposed coil spring 104. Each plunger is formed at its outer, locking end with a conical projection 105 that is adapted to be engaged in a conical hole 106 in a bushing 107. Bushings 107 are mounted in lugs or posts 111 which are formed integral with the base plate 40 and which project rearwardly therefrom. The plungers 100 have pins 108 secured in them which project rearwardly through slots 109 in the bearings 102. These pins can be grasped simultaneously by the photographer with the fingers of one hand and pressed together to disengage the conical nose portions 105 of the plungers 100 from the bushings 107 to unlock the focal plane plate and permit it to be swung upwardly as shown in Fig. 10.

Figure 11:
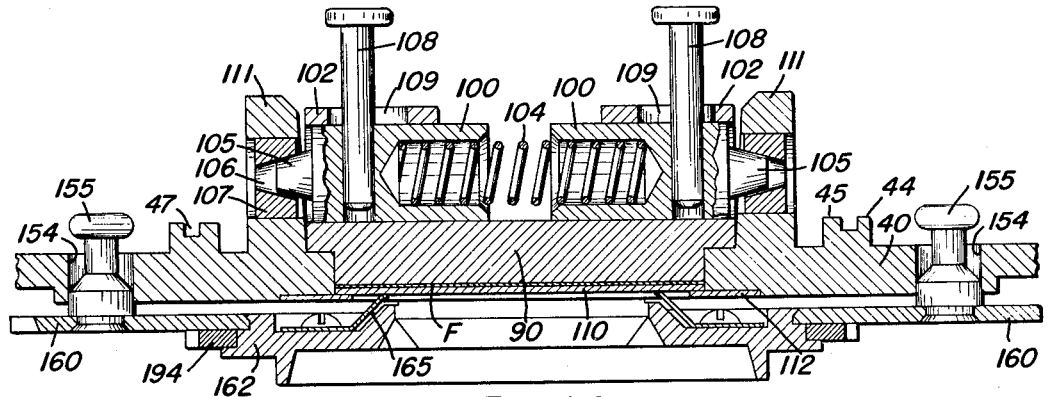
Fig. 11 is a transverse section through the magazine on a somewhat enlarged scale and taken on the line 11—11 of Fig. 8.

When the focal plane plate is swung upwardly, the film F can be threaded from the cassette C onto the take-up spool 53. After the lead end of the film is fastened in the take-up spool, the focal plane plate 90 is swung down again to the position shown in Fig. 8 to position the film leader flat against the dark slide 110 which slides into an opening 114 provided therefor in the base plate 40. This opening is inclined downwardly from one side of the base plate to the exposure aperture formed in the rectangular frame 112 (Figs. 8 and 11). Frame 112 is secured in any suitable manner in a rectangular recess in base plate 40. Dark-slide 110, when in operative position, is held in slot 114 and by frame 112 and in a recess 113 (Fig. 8) in base plate 40 behind this frame.

Figure 1:
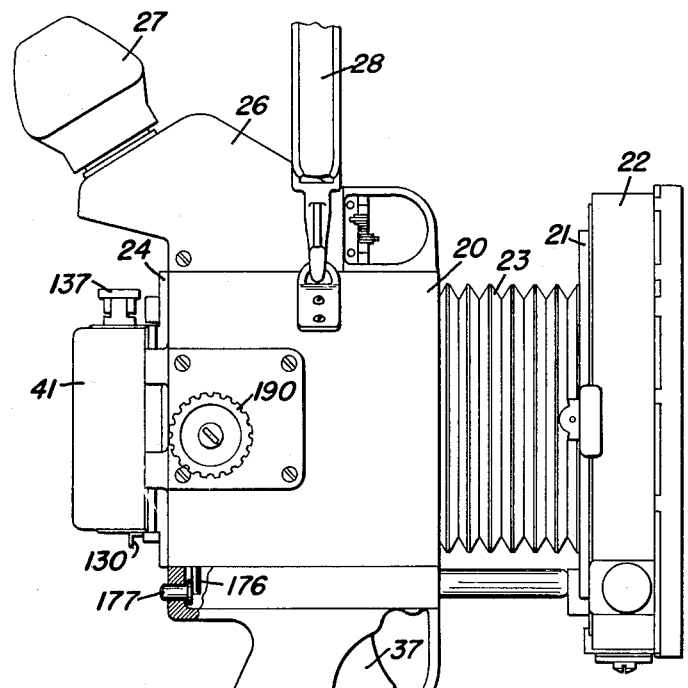
Fig. 1 is a side elevation of a camera built according to one embodiment of this invention.

To transport the film the take-up spool 53 is driven by a bevel gear 115 (Fig. 12) which is adapted to mesh with bevel gear 73 on shaft 72. The spur pinion 74 on this shaft meshes with a spur gear 116 which is journalled in the frame 70 and which meshes with another spur gear 117 (Fig. 8) that is also journalled in the frame 70. The spur gear 117 meshes with a wide-face spur gear 118 that is secured to the shaft 52 (Fig. 7). The bevel gear 115, as will be described further hereinafter, is adapted to be rotated upon rotation of knob 190 (Fig. 1).

Whenever the cover 41 is swung up out of the way, the take-up spool 53 is locked against rotation by a spring-pressed detent 120 (Fig. 8) which is adapted to engage with the teeth 55 of one of the flanges 54 of the take-up spool 53. This detent is constantly urged into engaged position by a spring 121 one end of which engages against the base 40 and the opposite end of which is wound around the tail 123 of the detent. When the cover is closed, a lug 124, which is formed on the inside of the cover, engages the tail 123 of the detent to disengage the detent. This permits transport of the film whenever the cover is closed.

After a roll of film has been completely exposed, it may be rewound into the cassette C by swinging the lever 130 (Figs. 5 and 6) from the position shown in Fig. 5 to that shown in Fig. 6. This lever is secured to a shaft 131 (Figs. 12 and 13) to the inner end of which is secured a cam member 132 having a cam surface 134. The cam surface 134 engages the left hand end 133 of the shaft 72, as viewed in Figs. 12 and 13. Hence when the lever 130 is swung upwardly from the position shown in Figs. 5 and 12 to that shown in Figs. 6 and 13 the shaft 72 is moved to the right against the resistance of the coil springs 135 and 136 to disengage the gear 73 from the gear 115, and to disengage the spur gear 74 from the spur gear 116, thus freeing the spool 53 of any load of the transporting mechanism. The film can then readily be rewound in the cassette by rotating the knob or lever 137 (Figs. 1 and 7). Coil spring 135 surrounds shaft 72 and is housed within the sprocket spool or sleeve 82, being interposed between an internal shoulder in said spool or sleeve and the right-hand end of the sleeve portion 77 of bevel gear 73. Coil spring 136 surrounds shaft 72 and is mounted within a recess or counterbore in gear 74 and is interposed between that gear and frame 70.

The cover 41 is locked in closed position by a locking dog 140 (Figs. 5 and 6) which is pivoted on a shaft 141 in the cover and which is operated by a lever 142 that is secured to the shaft. Fig. 5 shows the locking dog in disengaged position and Fig. 6 shows the locking dog in engaged position. It engages a pin 144 that is secured in a lug 145 (Figs. 7 and 9) formed on the rib 45.

The back or magazine is adapted to be removably secured to the rear of the body portion 20 of the camera by a pair of conventional sliding latches 150 (Figs. 7 and 9) which are secured to the base plate 40 by studs 151 and which pass through slots 152 in the catches and thread into the base plate. Each of these catches has a slot 153 in one end which is adapted to engage under the head of a stud 155 (Figs. 4 and 11) that is riveted in the rotary back plate 160 of the camera body. Studs 155 project rearwardly through holes 154 in base plate 40 when the base plate is mounted on the camera body. The latches 150 are turned up at their other ends, as denoted at 156, so that they may readily be pushed back and forth to unlocking position.

The plate 160 is secured to the body portion 30 of the camera by a gib 161 (Fig. 3) that is secured by screws 162 to the body member 20. Secured within a central opening in the plate 160 by swaging or riveting it over the bounding edge of the opening is a plate 162 (Figs. 4 and 11) which is formed with an oblong exposure aperture 164. There are a pair of leaf spring members 165 (Figs. 3, 4 and 11) secured along the two long parallel sides of the aperture opening 164 by screws 166. The aperture opening 164 in the body portion of the camera is adapted to register with the aperture opening in the base plate 40 of the back, when the back is secured to the body of the camera. When the back is so secured to the body of the camera, dark slide 110 may be removed. The leaf springs 165 then press against the portion of the film which is in registry with the aperture openings. Any photographic film is concave on the emulsion side. The spring fingers 165 are adapted to engage the emulsion side of the film along its lateral edges and flatten it against the focal plane plate. Thus the portion of the film to be exposed is held flat against the focal plane plate 90, and is correctly positioned in the focal plane of the camera. The film is thus registered from the back by the solid focal plane plate. The conical noses 105 of the plungers 100 (Fig. 11) cooperating with the conical recesses 106 in the bearings 107 serve to insure registry of the film because through the pressure of the spring 104 the plungers 100 are forced apart, thus moving the focal plane plate forward to bring the film into registry from the back.

The plate 160 is rotatable through ninety degrees to position the exposure aperture and the film for either a vertical or a horizontal picture. To rotate the plate, the plate is unlocked and is simply revolved by hand by grasping the back 24.

Figure 2:
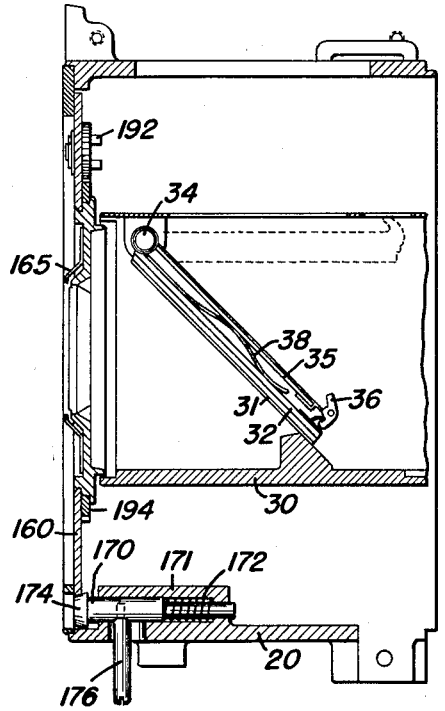
Fig. 2 is a longitudinal vertical section through the body portion of the camera housing.

The plate 160 is locked in either of its positions of adjustment, namely, either with the exposure aperture horizontal or vertical, by a locking dog or detent 170 (Fig. 2). This detent is slidably housed within a lug 171 formed in the body assembly 20 of the camera. It is normally spring-pressed into locking position by a coil spring 172. It has an enlarged head 174 at its rear end which is conical shaped and which is adapted to engage with one or other of two correspondingly shaped recesses or kerfs 175 (Fig. 3) formed on the periphery of the plate 160 and spaced ninety degrees apart. A pin 176 which is secured in the detent 170 is provided to permit manual disengagement of the detent from the plate 160. A button 177 (Fig. 1) that is slidably mounted in the camera body 20 is provided to engage the pin 176, when pressed forwardly, to disengage the detent 170.

A stop pin 180 (Fig. 3) is provided to limit the movement of the plate 160 in opposite directions. The periphery of the stop plate 160 is formed with an arcuate groove 181 that extends for ninety degrees around the periphery of the plate 160. The pin 180 is positioned to engage the shoulders 182 and 183 formed on the periphery of the plate at opposite ends of the groove 181, thereby to limit movement of the plate 180 in opposite directions, so that the back is moved only through ninety degrees to position the film for a vertical or a horizontal picture as desired.

In the camera of the character described, after a picture has been taken, the mirror is returned manually into abutment with the shutter to be in viewing position for use in lining up the next picture. This return movement is effected by rotation of knob 190 (Figs. 1 and 3). This knob is secured to a shaft that is geared to the mirror so that on rotation of the knob in one direction the mirror is returned to cocked, viewing position. This shaft is also geared to the film transport mechanism, as described more particularly in my copending application Serial No. 250,603, filed, October 10, 1951. This shaft drives either the pinion 192 (Figs. 2 and 3) or the pinion 193, depending upon the position of the back. These pinions both mesh with and drive the gear 194 (Figs. 2, 4 and 11) which in turn meshes with and drives the pinion 195 (Fig. 3). Pinion 195 is adapted to be coupled to the bevel gear 115, when the back is secured to the camera, the coupling being through a coupling pin 196 (Figs. 12 and 13) which is mounted in the bevel gear and which is spring-pressed outwardly by a coil spring 197 that is housed in the bevel gear and that is interposed between the head of the coupling pin 196 and a disc 198 that is secured in the bevel gear 115. The pin 196 is square in cross-section and the pinion 195 has a square bore 199 to receive the pin 196. Pin 196 aligns with hole 199 when the back 24 is secured to the body portion of the camera. Hence when the back is secured to the body portion of the camera the film transport gear 115 (Figs. 12 and 13) is drivingly engaged with film transport knob 190.

Through the gearing described, the take-up spool can be rotated to take up exposed film and present a new portion of film for exposure.

After the full roll of film has been exposed it is rewound into the cassette C by moving the lever 130 (Fig. 6) upwardly to shift the bevel gear 73 (Fig. 13) out of engagement with the bevel gear 115 and take the load of the gearing off the take-up spool. After the exposed film has been rewound into the cassette, the cover 41 may be swung open; the focal plane plate 90 may be swung upwardly out of the way as shown in Fig. 10; the cassette may be removed from the saddles 64; a new cassette may be positioned on the saddles; the film leader may be fed from the new cassette to the take-up spool 53; the focal plane plate 90 may be swung back to position to properly position the film; and the cover 41 may be closed. The camera is now loaded ready for taking a new series of pictures. The cover 41 when closed, provides a suitable hand grip so as to permit ready rotation of the back on the camera body for taking either a vertical or a horizontal picture.

To remove the back or magazine from the camera all that is required is to push the latches 150 (Fig. 7), respectively, to the right and left, and lift the back off the body portion of the camera. The dark slide, of course, will be placed in operative position before removing the back from the camera.

While the invention has been described in connection with a particular embodiment thereof, it will be understood that it is capable of further modification; and this application is intended to cover any variations, uses, or adaptations of the invention following, in general, the principles of the invention and including such departures from the present disclosure as come within known or customary practice in the art to which the invention pertains and as may be applied to the essential features hereinbefore set forth and as fall within the scope of the invention or the limits of the appended claims.

Having thus described my invention, what I claim is:

1. A removable film magazine for photographic cameras comprising a base having an exposure aperture therein, means on said base for supporting a film supply spool at one side of said exposure aperture, a take-up spool rotatably mounted on said base at the opposite side of said exposure aperture, a frame mounted on said base for pivotal movement about the axis of said take-up spool, a metering spool rotatably mounted in said frame, and a focal plane plate carried by said frame, said frame being swingable away from said exposure aperture to permit the leader of the film to be fed from said supply spool to said take-up spool, and said frame when swung toward said exposure aperture moving said focal plane plate and said metering spool into engagement with said film, and means for resiliently forcing said focal plane plate toward said exposure aperture, when the frame is swung to the latter position, thereby to hold the film engaged thereby in picture-taking position.

2. A removable film magazine for photographic cameras comprising a base having an exposure aperture therein, means on said base for supporting a film supply spool at one side of said exposure aperture, a take-up spool rotatably mounted on said base at the opposite side of said exposure aperture, a frame mounted on said base for pivotal movement about the axis of said take-up spool, a metering spool rotatably mounted in said frame, and a focal plane plate carried by said frame, said frame being swingable away from said exposure aperture to permit the leader of the film to be fed from said supply spool to said take-up spool, and said frame when swung toward said exposure aperture moving said focal plane plate and said metering spool into engagement with said film and means for resiliently holding said metering spool in engagement with the film and forcing said focal plane plate toward said exposure aperture, when the frame is swung to the latter position.

3. A removable film magazine for photographic cameras comprising a base having an exposure aperture therein, means on said base for supporting a film supply spool at one side of said exposure aperture, a take-up spool rotatably mounted on said base at the opposite side of said exposure aperture, a frame mounted on said base for pivotal movement about the axis of said take-up spool, a metering spool rotatably mounted in said frame, and a focal plane plate carried by said frame, said frame being swingable away from said exposure aperture to permit the leader of the film to be fed from said supply spool to said take-up spool, and said frame when swung toward said exposure aperture moving said focal plane plate and said metering spool into engagement with said film, and means for resiliently holding said metering spool in engagement with the film, and forcing said focal plane plate toward said exposure aperture, when said frame is swung to the latter position, said last-named means operating also in the latter position of the frame to lock the frame in said latter position.

4. A removable film magazine for photographic cameras comprising a base having an exposure aperture therein, means on said base for supporting a film supply roll at one side of said exposure aperture, a take-up spool rotatably mounted on said base at the opposite side of said aperture, a frame pivotally mounted on said base for pivotal movement about the axis of said take-up roll, a toothed metering spool supported on said frame for rotation about an axis parallel to the pivotal axis of said frame, a focal plane plate mounted on said frame for pivotal movement about the axis of said metering spool, means for securing said focal plane plate in position behind said exposure aperture, and resilient means operative, when said focal plane plate is in said last-named position, for forcing said focal plane plate toward said aperture to cause said focal plane plate to engage and force the film into picture-taking position.

5. A removable film magazine for photographic cameras comprising a base having an exposure aperture therein, means on said base for supporting a film supply roll at one side of said exposure aperture, a take-up spool rotatably mounted on said base at the opposite side of said aperture, a frame pivotally mounted on said base for pivotal movement about the axis of said take-up roll, a toothed metering spool supported on said frame for rotation about an axis parallel to the pivotal axis of said frame, a focal plane plate mounted on said frame for pivotal movement about the axis of said metering spool, means for securing said focal plane plate in position behind said exposure aperture, resilient means operative, when said focal plane plate is in said last-named position, for forcing said focal plane plate toward said aperture to cause said focal plane plate to engage and force the film into picture-taking position, and gearing rotatably mounted on said frame connecting said metering spool with said take-up roll.

6. A removable film magazine for photographic cameras comprising a base having an exposure aperture therein, means on said base for rotatably supporting a film supply roll at one side of said exposure aperture, a take-up spool rotatably mounted on said base at the opposite side of said exposure aperture, a frame mounted on said base for pivotal movement about the axis of said take-up spool, a focal plane plate mounted on said frame for pivotal movement about an axis parallel to the axis of said take-up spool, a film-transport drive gear movably mounted in said base, a shaft mounted in said frame for rotary and axial movement about and in the direction of the axis of pivotal movement of said focal plane plate, a metering spool secured to said shaft to rotate therewith, means preventing axial movement of said metering spool with said shaft, a second gear secured to said shaft against axial and rotary movement relative thereto and adapted to mesh with said drive gear, a third gear secured to said shaft against axial and rotary movement relative thereto, gearing rotatably mounted in said frame and adapted to drivingly connect said third gear with said take-up spool to drive said take-up spool from said shaft, resilient means constantly urging said shaft axially in one direction to cause said second gear to be drivingly engaged with said drive gear and to cause said third gear to be drivingly engaged with said gearing, a cover pivotally mounted on said base and adapted to enclose said supply roll, metering spool and take-up spool, a lever pivotally mounted in said cover, a cam secured to said lever to engage one end of said shaft to move said shaft against said resilient means to disengage said second and third gears, and means for rotating said supply roll to rewind film thereon.

7. A removable film magazine for photographic cameras comprising a base having an exposure aperture therein, means on said base for supporting a film supply roll at one side of said exposure aperture, a take-up spool rotatably mounted on said base at the opposite side of said exposure aperture, a focal plane plate pivotally mounted on said base behind said exposure aperture to be swung out of the way to permit the leader of the film to be fed from the supply roll to said take-up spool and to be swung into operative position to engage the back of the film after the leader has been so fed, a cover pivotally mounted on said base and adapted to enclose the supply roll, take-up spool and focal plane plate, a detent for holding said take-up spool against rotation when said cover is open, and means on the inside of said cover for disengaging said detent when said cover is closed.

References Cited in the file of this patent

UNITED STATES PATENTS

| | | |
|---|---|---|
| 1,835,457 | Briechle | Dec. 8, 1931 |
| 1,870,091 | Briechle | Aug. 2, 1932 |
| 1,936,923 | Traenkle | Nov. 28, 1933 |
| 2,131,926 | Weiblen | Oct. 4, 1938 |
| 2,379,690 | Cunningham | July 3, 1945 |
| 2,384,637 | Owens | Sept. 11, 1945 |
| 2,403,587 | Doyle et al. | July 9, 1946 |
| 2,418,992 | Simmon | Apr. 15, 1947 |
| 2,477,904 | Schwartz | Aug. 2, 1949 |
| 2,495,161 | Doyle et al. | Jan. 17, 1950 |